US011718515B2

(12) United States Patent
Yamashita et al.

(10) Patent No.: US 11,718,515 B2
(45) Date of Patent: Aug. 8, 2023

(54) LIQUID SALE MANAGEMENT DEVICE

(71) Applicants: Asahi Group Holdings, Ltd., Tokyo (JP); ASAHI BREWERIES, LTD., Tokyo (JP)

(72) Inventors: Naoyuki Yamashita, Kashiwa (JP); Junichi Kitano, Kawaguchi (JP); Takashi Wada, Kobe (JP); Kenji Kusunoki, Kobe (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 628 days.

(21) Appl. No.: 16/765,381

(22) PCT Filed: Nov. 16, 2018

(86) PCT No.: PCT/JP2018/042440
§ 371 (c)(1),
(2) Date: May 19, 2020

(87) PCT Pub. No.: WO2019/102942
PCT Pub. Date: May 31, 2019

(65) Prior Publication Data
US 2020/0339408 A1 Oct. 29, 2020

(30) Foreign Application Priority Data
Nov. 21, 2017 (JP) ................. 2017-223949

(51) Int. Cl.
B67D 1/07 (2006.01)
B67D 1/08 (2006.01)
(Continued)

(52) U.S. Cl.
CPC ............. B67D 1/07 (2013.01); B67D 1/0867 (2013.01); B67D 1/1247 (2013.01);
(Continued)

(58) Field of Classification Search
CPC ......... B67D 1/07; B67D 1/1211; G07F 9/026; G07F 13/065; G07F 13/06
(Continued)

(56) References Cited

U.S. PATENT DOCUMENTS 4,225,057 A * 9/1980 Horn .................... B67D 1/1243
222/34
4,941,593 A * 7/1990 Hicks ....................... B67D 1/07
222/148
(Continued)

FOREIGN PATENT DOCUMENTS

CN 101189179 5/2008
CN 103429524 12/2013
(Continued)

OTHER PUBLICATIONS

Extended European Search Report dated Jul. 26, 2021 in corresponding European Patent Application No. 18880113.8.
(Continued)

Primary Examiner — Timothy R Waggoner
(74) Attorney, Agent, or Firm — Wenderoth, Lind & Ponack, L.L.P.

(57) ABSTRACT

A liquid sales management device is to be added to a liquid supply system supplying a liquid within a storage container to a dispensing device through a supply pipe with the liquid pressurized in order to cool the liquid in the dispensing device, and dispensing the cooled liquid to a drinking container. The liquid sales management device includes an actual flow rate determining unit that determines an actual measured flow rate of the liquid dispensed into the drinking container from the dispensing device, a cleaning mode detection unit that detects a cleaning mode in the liquid supply system, and a consumption flow rate acquisition unit that determines an actual consumption of the liquid based on the number of cycles of the cleaning mode, a known liquid
(Continued)

amount consumed in one cycle of the cleaning mode in the liquid supply system, and the actual measured flow rate.

8 Claims, 5 Drawing Sheets

(51) Int. Cl.
*G06Q 10/0631* (2023.01)
*G06Q 10/087* (2023.01)
*G07F 9/02* (2006.01)
*B67D 1/12* (2006.01)
*B67D 1/04* (2006.01)

(52) U.S. Cl.
CPC ..... *G06Q 10/06315* (2013.01); *G06Q 10/087* (2013.01); *G07F 9/026* (2013.01); *B67D 1/0406* (2013.01); *B67D 2210/00104* (2013.01)

(58) Field of Classification Search
USPC .......................................... 700/236; 222/148
See application file for complete search history.

(56) References Cited

U.S. PATENT DOCUMENTS

| | | | |
|---|---|---|---|
| 5,636,763 A | 6/1997 | Furness | |
| 2022/0250894 A1* | 8/2022 | Ambauen | ................ B67D 1/07 |

FOREIGN PATENT DOCUMENTS

| | | | | |
|---|---|---|---|---|
| EP | 1 767 489 | | 3/2007 | |
| GB | 2 287 296 | | 9/1995 | |
| GB | 2542601 A | * | 3/2017 | ............... B67D 1/07 |
| JP | 2003-192096 | | 7/2003 | |
| JP | 5393389 | | 1/2014 | |
| JP | 2014-19454 | | 2/2014 | |
| WO | 2012/120254 | | 9/2012 | |

OTHER PUBLICATIONS

Office Action dated Apr. 2, 2021 in Chinese Application No. 201880074547.2, with English translation.
International Search Report dated Feb. 19, 2019 in International (PCT) Application No. PCT/JP2018/042440.

* cited by examiner

LIQUID SALE MANAGEMENT DEVICE

TECHNICAL FIELD

The present invention relates to a liquid sales management device capable of being added to a liquid supply system, and particularly, to a liquid sales management device capable of ascertaining the amount of actually consumed liquid (actual consumption) including the amount of liquid consumed without being provided for drinking.

BACKGROUND ART

In a restaurant, a liquid supply system is generally used as a device for providing a liquid, for example, beer. When the beer is used as an example, the liquid supply system includes a carbon dioxide gas cylinder, a beer barrel filled with beer, a supply pipe, and a beer dispenser. The liquid supply system pressurizes the beer within the beer barrel with a carbon dioxide gas of the carbon dioxide gas cylinder, and pumps the beer from the supply pipe to the beer dispenser. The beer dispenser has a beer cooling pipe provided within a cooling tank, a refrigeration machine, and a dispensing outlet. The beer dispenser freezes a part of a cooling water within the cooling tank by the refrigeration machine, cools the beer causing the beer to flow within the bear cooling pipe by a lever operation at the dispensing outlet, and dispenses the beer to a drinking container such as a beer mug.

Thus, most beer within the beer barrel are consumed for serving to customers.

Meanwhile, in the liquid supply system, there is a relatively long pipeline including the beer cooling pipe through which the beer flows from a beer barrel outlet to the dispensing outlet as described above, and contamination such as fur or scale adheres to the inside of the pipeline in accordance with the usage of the pipeline. The contamination causes to propagate various germs and generate unfavorable taste, and then leads to serve unpleasant beer.

Therefore, from the viewpoint of hygiene management and quality management of provided beer, beer manufactures manage the hygiene and maintain the quality of the provided beer by giving guidance on cleaning the pipeline between the beer barrel outlet and the dispensing outlet to a user (for example, restaurant) of the liquid supply system in a regular manner, for example, whenever a business is over. As a simple example of this cleaning operation, there is water cleaning with which cleaning water (tap water) passes through the pipeline.

The above-described water cleaning operation is performed by switching the liquid passing through the supply pipe from the beer to the washing water and pumping the washing water. By this water cleaning operation, the beer remaining in the pipeline between the beer barrel outlet and the dispensing outlet is exhausted and is discarded when the business is over. That is, a certain amount of beer not served for drinking is consumed by executing the water cleaning operation.

After the water cleaning is performed in this manner, in preparation for the next beer supply, the cleaning water present in the pipeline between the beer barrel outlet and the dispensing outlet is replaced with the carbon dioxide gas by injecting the carbon dioxide gas into the pipeline, and the inside of the pipeline is in an empty liquid state. With a series of these operations, the water cleaning operation ends.

Thus, the inside of the pipeline between the beer barrel and the dispensing outlet is in the empty liquid state by the end of the water cleaning operation. Therefore, when the next business starts, an operation of introducing and pumping the beer from the beer barrel into the pipeline in the empty liquid state (hereinafter, referred to as "lead-in" operation) is performed. In this lead-in operation, since a mixed liquid in a state in which the beer and the carbon dioxide gas are mixed flows within the pipeline, the beer within this lead-in operation is also discharged from the dispensing outlet. Therefore, a certain amount of beer not served for drinking is consumed even in the lead-in operation.

Thus, a certain amount of beer is consumed by the water cleaning operation and the lead-in operation. Therefore, in the beer barrel filled with a predetermined amount of beer, the amount of beer actually consumed including the sales amount to be served to customers is not been clearly ascertained until now.

JP 5393389 determines whether or not a cleaning operation is performed in a liquid supply system, but does not attempt to ascertain the amount of actually consumed beer in consideration of the water cleaning operation and the lead-in operation as in the present application.

The present invention has been made in order to solve such a problem, and an object of the present invention is to provide a liquid sales management device capable of ascertaining an actual consumption of liquid from a storage container of the liquid.

SUMMARY OF THE INVENTION

To achieve the aforementioned object, the present invention has a configuration to be described below.

That is, a liquid sales management device according to an aspect of the present invention is a liquid sales management device capable of being added to a liquid supply system, the liquid supply system supplying a liquid within a storage container to a dispensing device through a supply pipe with the liquid pressurized in order to cool the liquid in the dispensing device, and dispensing the cooled liquid to a drinking container from the dispensing device, the liquid sales management device comprising:

an actual flow rate determining unit including a flow rate sensor which detects the amount of liquid dispensed into the drinking container, and configured to determine an actual measured flow rate of the liquid dispensed into the drinking container from the dispensing device;

a cleaning mode detection unit configured to detect a cleaning mode in the liquid supply system; and a consumption flow rate acquisition unit electrically connected to the actual flow rate determining unit and the cleaning mode detection unit, the consumption flow rate acquisition unit configured to determine an actual consumption of the liquid with the number of times of the cleaning mode, a known liquid amount consumed with one operation of the cleaning mode in the liquid supply system, and the actual measured flow rate.

According to the liquid sales management device described above, it is possible to ascertain the actual consumption of the liquid from the storage container by providing the consumption flow rate acquisition unit.

Since the actual consumption can be ascertained, the remaining amount of the liquid within the storage container can be accurately ascertained, and the new storage container can be adequately ordered.

It is possible to detect whether or not the cleaning operation is performed by providing the cleaning mode detection unit. Therefore, it is possible to check whether or not the quality management of the served liquid is performed, and it is also possible to adequately provide quality management guidance.

DESCRIPTION OF THE INVENTION

Figure 1:
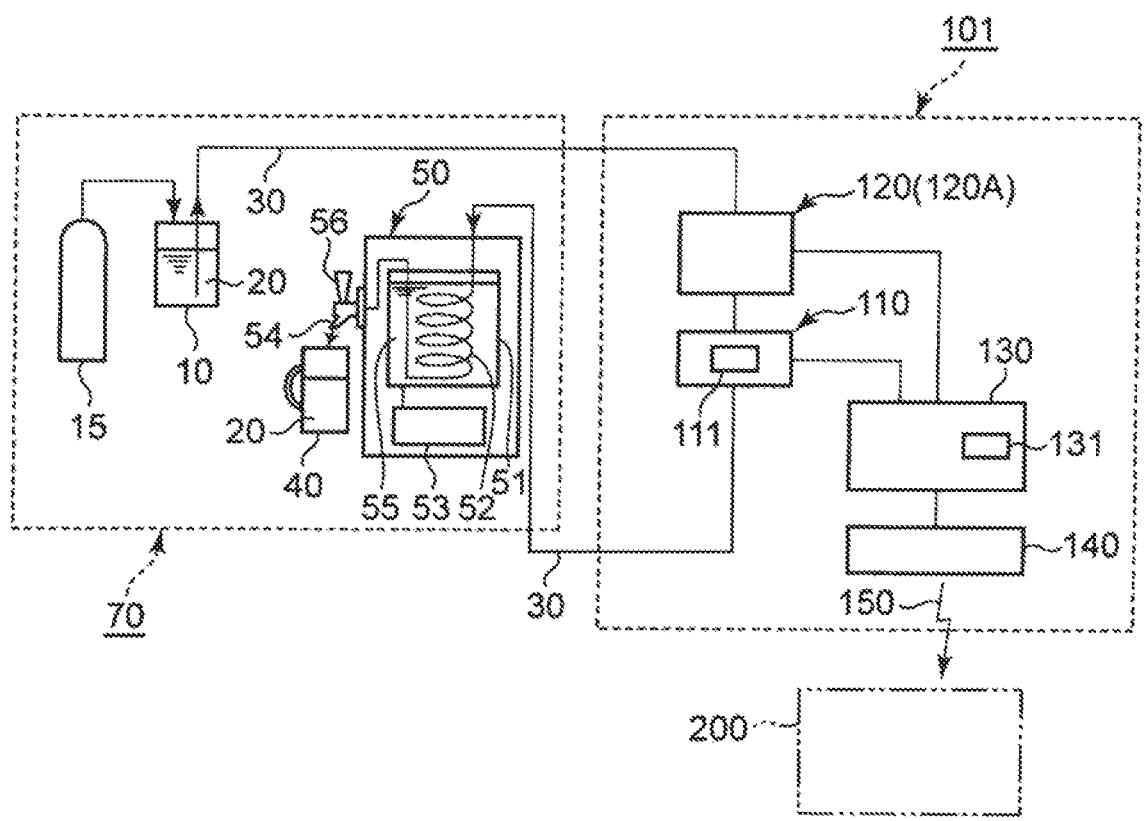
FIG. 1 is a block diagram illustrating a configuration of a liquid sales management device according to a first embodiment of the present invention.

A liquid sales management device according to an embodiment of the present invention will be described below with reference to the drawings. In the drawings, the same or similar components are denoted by the same reference symbols. In order to avoid the following description from being unnecessarily redundant and to facilitate the understanding of those skilled in the art, detailed description of well-known matters and redundant description of substantially the same configuration may be omitted. The following description and the contents of the accompanying drawings are not intended to limit the subject matter described in the claims.

As illustrated in FIG. 1, a liquid sales management device according to a first embodiment to be described below is a liquid sales management device 101 capable of being added to, that is, capable of being electrically and mechanically connected to an existing liquid supply system 70. In the present embodiment, one liquid sales management device 101 is attached to one set of the liquid supply system 70.

In each of the following embodiments including the first embodiment, beer is used as an example of a liquid to be handled, but the liquid is not limited to beer. Alcohol drinks such as low-malt beer, liqueur, shochu highball, whiskey, and wine, drinking water, soft drinks, and carbonated drinks may be used.

Here, the liquid supply system 70 includes a storage container 10, a pressurization source 15, a supply pipe 30, and a dispensing device 50, and is a system that supplies, that is, supplies, feeds, or pressure transfers a liquid (beer in each embodiment as described above) 20 within the storage container 10 to the dispensing device 50 through the supply pipe 30 with pressurization by using the pressurization source 15, and dispenses the liquid from the dispensing device 50 to a drinking container (for example, a beer mug) 40. Here, in each embodiment, the storage container 10 is a stainless steel container called as a beer barrel filled with beer in a beer manufacturer, and has a capacity of, for example, 5 liters, 10 liters, or 19 liters. The pressurization source 15 is a carbon dioxide gas cylinder. The supply pipe 30 is a flexible resin tube made of, for example, polyamide, polyurethane, or polyester which enables beer to flow between the storage container 10 and the dispensing device 50. As will be described below, a device included in the liquid sales management device 101 is attached to the supply pipe 30. It is preferable that inner diameters of flow passages of a fluid from the supply pipe 30 to a liquid dispensing outlet 54 in the dispensing device 50 are designed to have the same dimension such that a cleaning with a sponge becomes easy.

In each embodiment, a beer dispenser (may be referred to as a "beer server") will be described as an example of the dispensing device 50 (hereinafter, may be accordingly referred to as the beer dispenser 50). As already described above, the beer dispenser 50 includes a liquid cooling pipe (beer cooling pipe in each embodiment) 52 disposed inside a cooling tank 51, a refrigeration machine 53, and the liquid dispensing outlet 54. The beer dispenser freezes a part of a cooling water 55 within the cooling tank 51 by using the refrigeration machine, and cools the beer passing through the beer cooling pipe 52 by using the cooling water 55. The beer transferred by the pressurization source 15 passes through the beer cooling pipe 52 by an operation of a lever 56 at the dispensing outlet 54 while being cooled with the cooling pipe, is dispensed into the drinking container 40 such as the beer mug, and then is served to a customer.

The beer dispenser 50 is generally used in an environment in which an external air temperature is equal to or higher than 5° C. and is equal to or lower than 40° C. The liquid handled by the dispensing device 50 is not limited to the beer, and may be a drinking water, etc. In each embodiment, the beer dispenser 50 cools the beer as a target liquid, but the dispensing device 50 included in each embodiment may also heat the target liquid or keep the target liquid warm.

In addition, guidance is given to perform the water cleaning already described above with respect to the flow passage from an outlet of the storage container 10 to the liquid dispensing outlet 54 of the dispensing device 50, that is, a flow passage within the liquid supply system 70 and a flow passage within a device included in the liquid sales management device 101 which is attached to the supply pipe 30 and is described below in detail. Here, the water cleaning operation is performed by replacing a cleaning water tank that contains, for example, a tap water as the cleaning water with the storage container 10, switching the liquid to be supplied to the supply pipe 30 from the beer to the cleaning water, and transferring the cleaning water by using carbon dioxide gas. Due to this water cleaning operation, the flow passage from an outlet of the cleaning water tank to the liquid dispensing outlet 54 of the dispensing device 50 is cleaned with the cleaning water.

Hereinafter, the liquid sales management device 101 according to the first embodiment will be described in detail.

The liquid sales management device 101 is a device capable of ascertaining an actually consumed amount (hereinafter, referred to as "actual consumption") of the liquid (beer) filled in the storage container 10. The liquid sales management device includes, as a basic configuration, an actual flow rate determining unit 110, a cleaning mode detection unit 120, and a consumption flow rate acquisition unit 130, and may further include a transmission unit 140 and an analysis unit 160. These components will be sequentially described below.

The actual flow rate determining unit 110 has a flow rate sensor 111 that detects the amount of liquid dispensed into the drinking container 40, and the actual flow rate determining unit determines an actual measured flow rate of the liquid, that is, the beer in each embodiment, dispensed into the drinking container 40 from the dispensing device 50 based on a detection signal of the flow rate sensor 111.

In each embodiment, the flow rate sensor 111 is installed at an appropriate position between the cleaning mode detection unit 120 and the beer dispenser 50 so as to sandwich the beer passing through the supply pipe 30. The installation position of the sensor is not limited thereto, and the flow rate sensor may be attached to, for example, the supply pipe 30 of the dispensing device 50. In each embodiment, an ultrasonic sensor is used as the flow rate sensor 111. The actual flow rate determining unit 110 having such a flow rate sensor 111 determines the actual measured flow rate of the liquid (beer) poured into the drinking container 40 based on the signal obtained from the flow rate sensor 111.

The cleaning mode detection unit 120 is a means for detecting that the liquid supply system 70 shifts to a cleaning mode. Here, one "cleaning mode" corresponds to one set of the water cleaning operation and the lead-in operation described above. This is because, when the water cleaning operation is performed, the lead-in operation is performed subsequently to the water cleaning operation.

In the "cleaning mode", an internal state of the supply pipe 30 changes. That is, the inside of the supply pipe 30 generally changes from beer to water to gas to beer. Therefore, the cleaning mode detection unit 120 may be any means that can detect such a state change within the supply pipe 30. The cleaning mode detection unit 120 needs to detect empty and replacement of the storage container 10 to be described below. Therefore, specifically, an empty liquid detection sensor can be used as a sensor which can detect gas and liquid, that is, can detect liquid such as beer, water, or gas, or can detect at least a phase that the liquid within the supply pipe 30 becomes gas. For example, on optical sensor, a capacitive sensor, or a conductivity sensor can be used as the empty liquid detection sensor. Since a pressure acting on a pipe wall of the resin supply pipe 30 changes depending on the state change within the supply pipe 30, a pipe pressure sensor (a pressure sensor) installed onto an outer surface of the pipe wall can also be used.

The following devices may be used as the cleaning mode detection unit 120 instead of the aforementioned various sensors. That is, in each embodiment, a fluid flow path adjustment device is mounted with respect to the supply pipe 30 between the storage container 10 and the beer dispenser 50 at an upstream side of the flow rate sensor 111. The fluid flow path adjustment device has an on-off switch, and is turned off by a store staff after the close of business. As described above, from the viewpoint of hygiene, since the cleaning operation of the liquid sales management device is being recommended after the close of business, it is possible to determine that the transition to the water cleaning operation has been performed with turning off the on-off switch. In this way, the fluid flow path adjustment device may be regarded as the cleaning mode detection unit 120, and each embodiment adopts this configuration (hereinafter, referred to as a fluid flow path adjustment device 120A for the sake of convenience in description). Note that, even after the on-off switch is turned off, the inside of the fluid flow path adjustment device 120A and the liquid sales management device 101 including the fluid flow path adjustment device 120A are in an energized state, and a necessary function portion is in an operable state.

The fluid flow path adjustment device 120A will be described with reference to FIGS. 3A to 3D.

The fluid flow path adjustment device 120A is a device as disclosed in, for example, JP No. 5649801 B by the applicant of the present invention, and is a device that is mounted with respect to the supply pipe 30, and prevents a carbon dioxide gas which is a pressurized gas from being ejected from the liquid dispensing outlet 54 of the beer dispenser 50 when the beer within the container 10 is exhausted (when the storage container 10 is empty) while the beer is being dispensed from the dispensing outlet 54 to the drinking container 40 and when the storage container 10 is replaced.

Figure 3A:
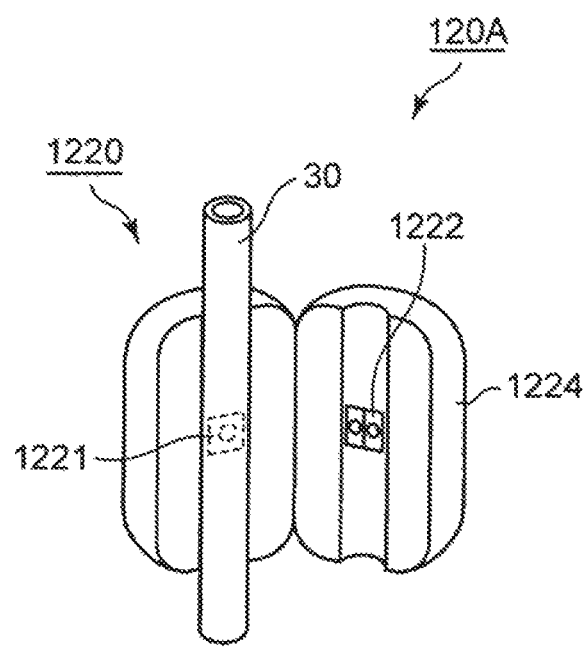
FIG. 3A is a perspective view illustrating a detection unit included in a fluid flow path adjustment device corresponding to an example of a cleaning mode detection unit included in the liquid sales management device illustrated in FIGS. 1 and 2.
Figure 3B:
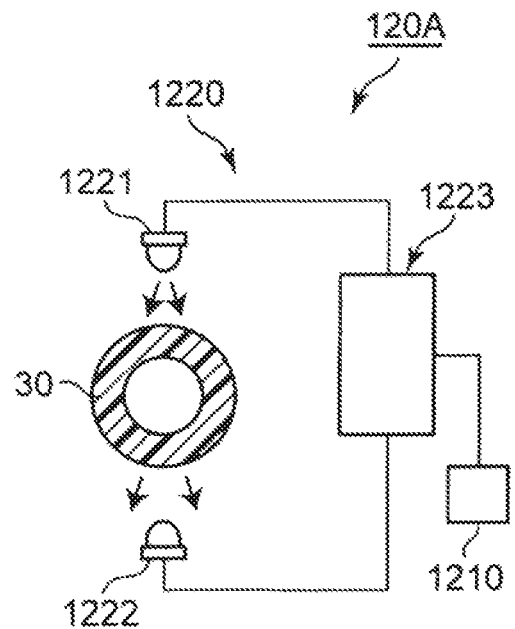
FIG. 3B is a diagram illustrating a schematic configuration of the fluid flow path adjustment device illustrated in FIG. 3A.

In order to prevent such ejection of the carbon dioxide gas, the fluid flow path adjustment device 120A includes a fluid stopper device 1210 and a detection unit 1220. As illustrated in FIGS. 3A and 3B, the detection unit 1220 includes a light emitting element 1221, a light receiving element 1222, and a liquid state determination unit 1223. The light emitting element 1221 and the light receiving element 1222 are positioned at a housing 1224 in the fluid flow path adjustment device 120A, the housing being arranged so as to sandwich the resin supply pipe 30 within the fluid flow path adjustment device 120A, and the elements being arranged to be opposed to each other across the beer passing through the supply pipe 30. The light emitting element 1221 emits infrared light, and the light receiving element 1222 receives the emitted infrared light. The light emitting element 1221 and the light receiving element 1222 are electrically connected to the liquid state determination unit 1223 that detects the state of the passing beer. That is, a refractive index of the light traveling from the light emitting element 1221 to the light receiving element 1222 varies depending on whether an object passing through the supply pipe 30 is a liquid, gas, or a mixture thereof. Therefore, the amount of light received by the light receiving element 1222 varies depending on the object passing through the supply pipe 30. The liquid state determination unit 1223 detects a change in the amount of received light, and activates the fluid stopper device 1210 when the passing object becomes gas.

Figure 3C:
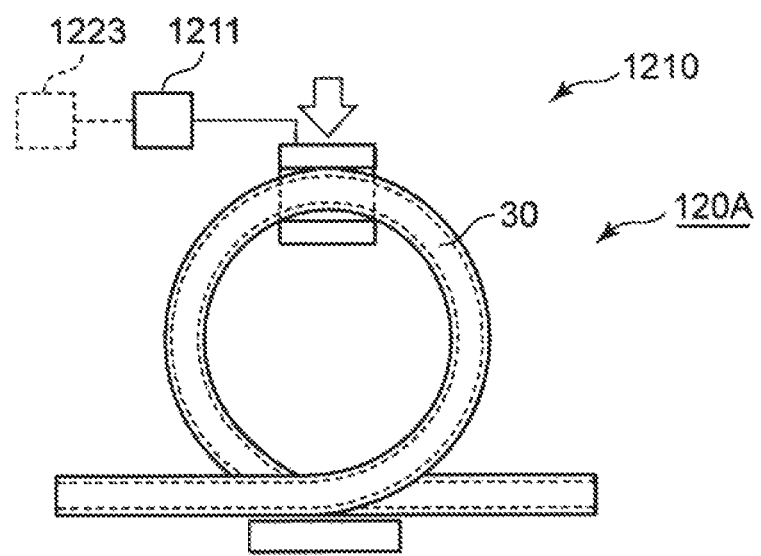
FIG. 3C is a diagram for explaining a schematic configuration and an operation of a fluid stopper device included in the fluid flow path adjustment device illustrated in FIG. 3A.
Figure 3D:
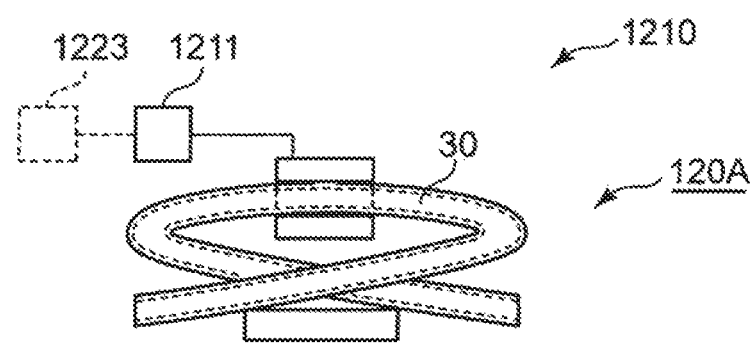
FIG. 3D is a view for explaining a schematic configuration and an operation of the fluid stopper device illustrated in FIG. 3C.

As illustrated in FIGS. 3C and 3D, the fluid stopper device 1210 includes, as a configuration example, the supply pipe 30 arranged in a loop shape, and a movement mechanism 1211 for moving a holding unit that holds the supply pipe 30. The movement mechanism 1211 moves the supply pipe 30 in an arrow direction with the control of the liquid state determination unit 1223, and thus, a flow path is blocked by bending and crushing the supply pipe 30. The supply pipe 30 of which the flow path is blocked is returned by the movement mechanism 1211.

The cleaning mode detection unit 120 is also used to detect that the storage container 10 is empty and that the storage container 10 is replaced with a new storage container. That is, in the configuration in which the fluid flow path adjustment device 120A is installed as in each embodiment, an empty storage container 10 and replacement of the storage container 10 can be detected with the operation of the fluid stopper device 1210 in the fluid flow path adjustment device 120A.

Meanwhile, in a configuration in which the fluid flow path adjustment device 120A is not mounted, the empty storage container 10 and replacement of the storage container 10 can be detected by the aforementioned empty liquid detection sensor or the like. That is, when the storage container 10 is empty, since the state within the supply pipe 30 generally changes from beer to gas and generally also changes from beer to gas to beer in a case that the storage container 10 is replaced, the empty storage container 10 and the replacement of the storage container 10 can be detected by the aforementioned empty liquid detection sensor.

As will be described below, according to the liquid sales management device 101 of each embodiment, the remaining amount of liquid within the storage container 10 can be recognized, and the empty and replacement storage container 10 can be detected. For example, a button for generating a signal indicating that the storage container 10 is empty or has been replaced is provided in the cleaning mode detection unit 120. Thus, it is possible to notify the outside of the empty or replacement storage container.

Next, the consumption flow rate acquisition unit 130 will be described.

The consumption flow rate acquisition unit 130 is electrically connected to the actual flow rate determining unit 110 and the cleaning mode detection unit 120, and determines the actual consumption of the beer on the basis of the number of times of the cleaning mode (i.e., the number of cleaning mode cycles), the known (pre-determined) beer (liquid) amount consumed with one operation (cycle) of the cleaning mode in the liquid supply system 70 (i.e. a pre-determined amount of beer consumed in the liquid supply system with each cleaning mode cycle), and the actual measured flow rate of the beer. Here, the known (pre-determined) beer (liquid) amount consumed in one operation (cycle) of the cleaning mode may be input to the consumption flow rate acquisition unit 130, or may be supplied to the consumption flow rate acquisition unit 130 from an analysis device 200 to be described below via a communication line 150.

The consumption flow rate acquisition unit 130 recognizes the number of times (cycles) of the cleaning mode due to the number of times a signal indicating that the liquid supply system is transferred to the "cleaning mode" is acquired, the signal being supplied from the cleaning mode detection unit 120. Here, since the fluid flowing through the supply pipe 30 includes fluids other than the beer after a "cleaning mode" signal is supplied, a flow rate measurement value obtained by the actual flow rate determining unit 110 may not be accurate. Therefore, after the "cleaning mode", the consumption flow rate acquisition unit 130 ignores the flow rate measurement value from the actual flow rate determining unit 110.

Meanwhile, the liquid consumption which is the amount of beer consumed with the liquid supply system 70 in the aforementioned water cleaning operation and the lead-in operation is a known amount unique to each liquid supply system 70 which depends on parameters such as the capacity of the beer dispenser 50. Thus, the consumption flow rate acquisition unit 130 can determine the amount of beer consumed from the storage container 10 in the cleaning mode, that is, the water cleaning operation and the lead-in operation, through the number of times (cycles) of the cleaning mode.

Therefore, the consumption flow rate acquisition unit 130 can determine the actual consumption of the storage container 10 by adding the amount of beer which is served for drinking, that is, the actual measured flow rate and is supplied from the actual flow rate determining unit 110, and the amount of beer consumed in the water cleaning operation and the lead-in operation, that is, the liquid consumption.

As described above, since the "cleaning mode" signal is supplied from the cleaning mode detection unit 120 to the consumption flow rate acquisition unit 130, the consumption flow rate acquisition unit 130 can detect whether or not the cleaning mode is executed in the liquid supply system 70. Therefore, the beer manufacturer side can check whether or not a restaurant having the liquid supply system 70 appropriately executes the quality management of the provided beer.

Such a consumption flow rate acquisition unit 130 is actually realized by using a computer, and is constituted by software corresponding to each of the aforementioned functions, a central processing unit (CPU) for executing the software, and hardware such as a memory. It is preferable that the computer actually corresponds to a microcomputer incorporated in the liquid sales management device 101, but a stand-alone personal computer may be used.

The consumption flow rate acquisition unit 130 may include a time information generation unit 131. The time information generation unit 131 generates time information for month, day, hour, and minute, and generates consumption flow rate information with the time information being added to the cleaning mode and the actual consumption.

The consumption flow rate acquisition unit 130, based on the time information, may ascertain the amount of beer served for drinking, that is, the actual measured flow rate which is supplied from the actual flow rate determining unit 110 with hours and minutes during the business hours of the restaurant.

Further, the liquid sales management device 101 of the first embodiment may include the transmission unit 140 that is electrically connected to the above consumption flow rate acquisition unit 130, and the transmission unit 140 transmits the consumption flow rate information to the communication line 150. Here, the transmission unit 140 may simply transmit information on the cleaning mode and the actual measured flow rate without adding the time information.

The liquid sales management device 101 of the first embodiment having the configuration described above operates as follows.

During the business, the store staff operates the lever 56 of the beer dispenser 50, and thus, the beer is dispensed into the drinking container 40. The amount of dispensed beer is measured with the actual flow rate determining unit 110, is supplied, as the actual measured flow rate, to the consumption flow rate acquisition unit 130, and is accumulated in the memory. At this time, the time information may be added to each actual measured flow rate.

For example, the cleaning mode detection unit 120 detects that the liquid supply system shifts to the cleaning mode with the turning off operation of the on-off switch in the fluid flow path adjustment device 120A or the detection using the aforementioned various sensors, and the cleaning mode detection unit sends the "cleaning mode" signal to the consumption flow rate acquisition unit 130. In response to this, the consumption flow rate acquisition unit 130 determines the liquid consumption in the water cleaning operation and the lead-in operation as described above. The consumption flow rate acquisition unit 130 determines the actual consumption of the liquid in the storage container 10 by using the actual measured flow rate and the liquid consumption. The cleaning mode detection unit 120 can detect whether or not the storage container 10 is replaced based on the operation of the fluid flow path adjustment device 120A or the detection using the aforementioned various sensors, and the consumption flow rate acquisition unit 130 may determine the remaining amount of the liquid within the storage container 10 based on the actual consumption.

Various pieces of information determined by the consumption flow rate acquisition unit 130 are sent from the transmission unit 140 to the communication line 150.

The liquid sales management device 101 of the first embodiment described above has the following effects.

Since various pieces of information are sent from the transmission unit 140 to the communication line 150, for example, the analysis device 200 (computer) on the beer manufacturer which is connected to the communication line 150 can ascertain the amount of beer served for drinking sent by the consumption flow rate acquisition unit 130 during the business hours, that is, the actual measured flow rate in hours and minutes for each restaurant, and can further ascertain whether or not the cleaning mode is executed and when the cleaning mode is performed, that is, a time zone and frequency.

Further, the analysis device 200 ascertains the capacity of the storage container 10 as described above in each store, or ascertains the capacity by inputting a capacity value in each store, and recognizes a point in time of replacement with the new storage container 10. Thus, the analysis device 200 can ascertain the remaining amount of liquid in the storage container 10 with the time information for each store based on the actual consumption obtained with the actual measured flow rate and the liquid consumption. Therefore, the analysis device 200 may automatically order the new storage container 10 (beer barrel) filled with beer (liquid) at an initial filling amount, and an ordering work of the new storage container 10 at each restaurant can be more efficient. It is possible to ascertain whether or not the storage container 10 is empty, whether or not the storage container 10 is replaced, and the frequency thereof.

Figure 2:
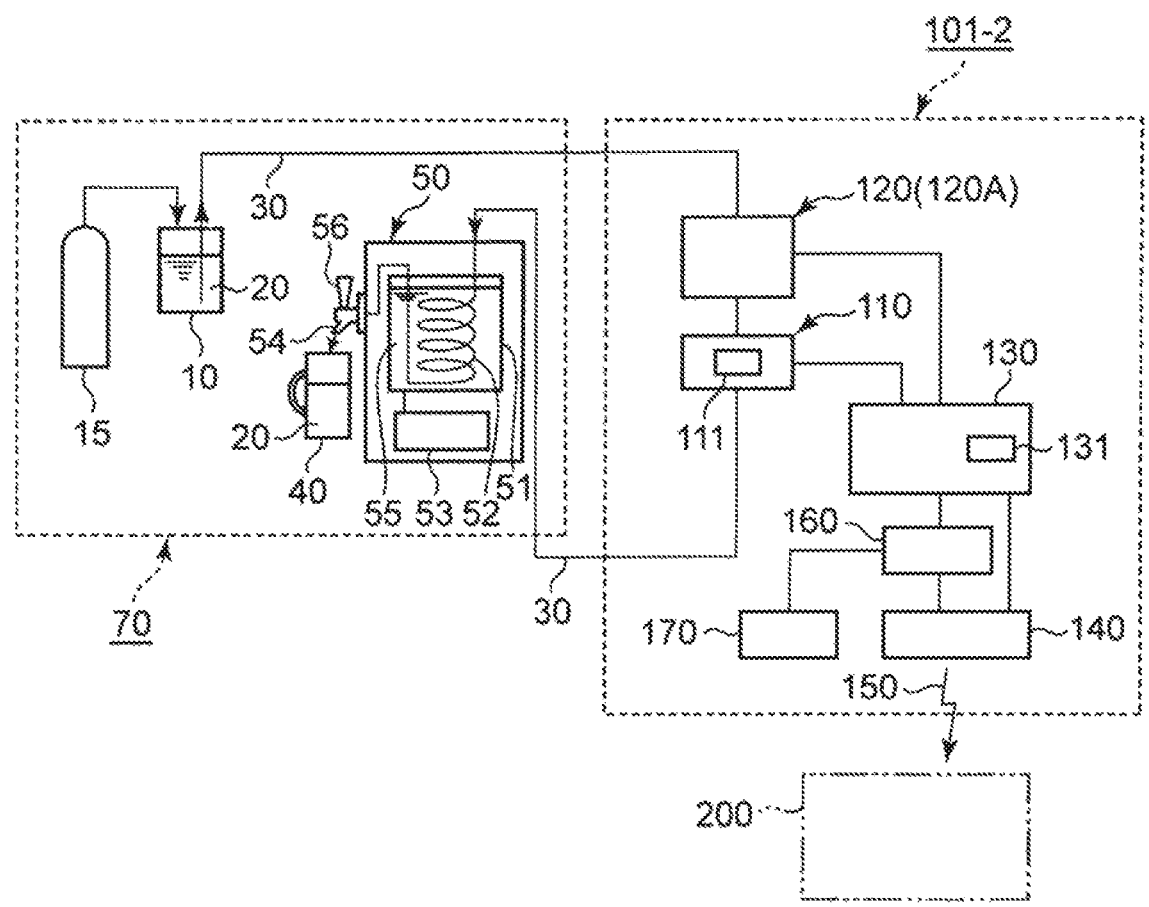
FIG. 2 is a block diagram illustrating a configuration of a liquid sales management device according to a second embodiment of the present invention.

Meanwhile, as in a liquid sales management device 101-2 of a second embodiment illustrated in FIG. 2, the analysis unit 160 and a display unit 170 may be included in addition to the configuration of the liquid sales management device 101 of the first embodiment described above.

The analysis unit 160 determines the remaining amount of beer (the remaining amount of liquid) within the storage container 10 by using the actual consumption in the storage container 10 and the initial filling amount in the storage container 10. The analysis unit 160 may also generate information for notifying the order of the new storage container 10 by inputting the capacity of the storage container 10 in such store.

The display unit 170 is electrically connected to the analysis unit 160, and displays the remaining amount of beer. A display method is not particularly limited. For example, a numerical value of the remaining amount may be displayed, or a color corresponding to the remaining amount may be displayed. The automatic order of the storage container 10 may also be displayed.

Further, the analysis unit 160 is electrically connected to the transmission unit 140. Therefore, in the liquid sales management device 101-2 of the second embodiment, the analysis unit 160 performs the sending of information on the remaining amount of beer and the order of the storage container 10. The transmission unit 140 is also electrically connected to the consumption flow rate acquisition unit 130.

Therefore, in the liquid sales management device 101-2 of the second embodiment, the analysis device 200 can achieve the same effects as those of the liquid sales management device 101 of the first embodiment described above.

In the liquid sales management device 101 according to the first embodiment, the display unit 170 may be electrically connected to the consumption flow rate acquisition unit 130 to display various pieces of information.

It is also possible to combine components illustrated in different embodiments.

Although the present invention has been fully described in connection with preferred embodiments thereof with reference to the accompanying drawings, various changes and modifications will be apparent to those skilled in the art. It is to be understood that such changes and modifications are intended to be included therein without departing from the scope of the invention as set forth in the appended claims.

All the disclosure contents of the specification, drawings, claims, and abstract of Japanese Patent Application No. 2017-223949 filed on Nov. 21, 2017 are incorporated herein by reference.

INDUSTRIAL APPLICABILITY

The present invention is applicable to a liquid sales management device that can be added to a liquid supply system.

DESCRIPTION OF REFERENCE SYMBOLS

10 STORAGE CONTAINER
30 SUPPLY PIPE
40 DRINKING CONTAINER
50 DISPENSING DEVICE
70 LIQUID SUPPLY SYSTEM
101, 101-2 LIQUID SALES MANAGEMENT DEVICE
110 ACTUAL FLOW RATE DETERMINING UNIT
111 FLOW RATE SENSOR
120 CLEANING MODE DETECTION UNIT
120A FLUID FLOW PATH ADJUSTMENT DEVICE
130 CONSUMPTION FLOW RATE ACQUISITION UNIT
131 TIME INFORMATION GENERATION UNIT
140 TRANSMISSION UNIT
150 COMMUNICATION LINE
160 ANALYSIS UNIT
1210 FLUID STOPPER DEVICE
1220 DETECTION UNIT

The invention claimed is:

1. A liquid sales management device to be connected to a liquid supply system, the liquid supply system supplying a liquid within a storage container to a dispensing device through a supply pipe with the liquid pressurized in order to cool the liquid in the dispensing device to obtain a cooled liquid, and dispensing the cooled liquid to a drinking container from the dispensing device, the liquid sales management device comprising:
an actual flow rate determining unit including a flow rate sensor configured to detect an amount of liquid dispensed into the drinking container, and configured to determine an actual measured flow rate of the liquid dispensed into the drinking container from the dispensing device;
a cleaning mode detection unit configured to detect a cleaning mode in the liquid supply system; and
a consumption flow rate acquisition unit electrically connected to the actual flow rate determining unit and the cleaning mode detection unit, the consumption flow rate acquisition unit configured to determine an actual consumption of the liquid based on a number of cleaning mode cycles, a pre-determined liquid amount consumed in each cycle of the cleaning mode in the liquid supply system, and the actual measured flow rate.

2. The liquid sales management device according to claim 1, wherein the consumption flow rate acquisition unit includes a time information generation unit configured to generate time information on month, day, hour, and minute, and generate consumption flow rate information with the time information being added to the cleaning mode and the actual consumption of the liquid.

3. The liquid sales management device according to claim 1, further comprising:
a transmission unit electrically connected to the consumption flow rate acquisition unit, and configured to transmit information on the cleaning mode and the actual consumption of the liquid to a communication line.

4. The liquid sales management device according to claim 1, further comprising:
an analysis unit configured to determine a remaining amount of liquid within the storage container by using the actual consumption of the liquid and an initial filling amount in the storage container.

5. The liquid sales management device according to claim 4, further comprising:
a transmission unit electrically connected to the analysis unit, and configured to transmit the remaining amount of liquid to a communication line.

6. The liquid sales management device according to claim 5, wherein the analysis unit is configured to order a new storage container through the transmission unit based on the remaining amount of liquid.

7. The liquid sales management device according to claim 1,
wherein the cleaning mode detection unit is an empty liquid sensor configured to detect a gas inside of the supply pipe, a pressure sensor configured to detect a pressure of the supply pipe, or an on-off switch in a fluid flow path adjustment device mounted to the supply pipe, and
the fluid flow path adjustment device is a device configured to be mounted in the supply pipe, and include a fluid stopper device which is configured to prevents a pressurized gas from being ejected from the dispensing device when the liquid within the storage container is exhausted and the storage container is replaced.

8. The liquid sales management device according to claim 1, wherein a liquid consumption is a total amount of a discharge amount of the liquid discharged from the liquid supply system and a lead-in amount to be supplied from the storage container to the liquid supply system in the cleaning mode.

* * * * *